(12) United States Patent
Tashev et al.

(10) Patent No.: US 11,593,633 B2
(45) Date of Patent: Feb. 28, 2023

(54) SYSTEMS, METHODS, AND COMPUTER-READABLE MEDIA FOR IMPROVED REAL-TIME AUDIO PROCESSING

(71) Applicant: Microsoft Technology Licensing, LLC, Redmond, WA (US)

(72) Inventors: Ivan Jelev Tashev, Kirkland, WA (US); Shuayb M Zarar, Redmond, WA (US); Matthai Philipose, Seattle, WA (US); Jong Hwan Ko, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1357 days.

(21) Appl. No.: 15/952,329

(22) Filed: Apr. 13, 2018

(65) Prior Publication Data
US 2019/0318237 A1  Oct. 17, 2019

(51) Int. Cl.
*G06N 3/08* (2006.01)
*G06F 3/16* (2006.01)
(Continued)

(52) U.S. Cl.
CPC ............... *G06N 3/08* (2013.01); *G06F 3/165* (2013.01); *G06N 3/0454* (2013.01); *G10L 25/78* (2013.01)

(58) Field of Classification Search
CPC ........ G06N 3/08; G06N 3/0454; G06N 3/063; G06F 3/165; G10L 25/78; G10L 25/30
See application file for complete search history.

(56) References Cited

U.S. PATENT DOCUMENTS

2007/0299659 A1* 12/2007 Chamberlain ........ G10L 19/173
  704/219
2014/0112493 A1*  4/2014 Tseng ...................... H04R 3/00
  381/73.1
(Continued)

OTHER PUBLICATIONS

Courbariaux, Matthieu, Yoshua Bengio, and Jean-Pierre David. "Binaryconnect: Training deep neural networks with binary weights during propagations." Advances in neural information processing systems 28 (2015) (Year: 2015).*
(Continued)

*Primary Examiner* — Daniel C Washburn
*Assistant Examiner* — Athar N Pasha
(74) *Attorney, Agent, or Firm* — Faegre Drinker Biddle & Reath LLP

(57) ABSTRACT

Systems, methods, and computer-readable storage devices are disclosed for improved real-time audio processing. One method including: constructing a deep neural network model, including a plurality of at least one-bit neurons, configured to output a predicted label of audio data, the plurality of at least one-bit neurons arranged in a plurality of layers, including at least one hidden layer, and being connected by a plurality of connections, each connection having at least a one-bit weight, wherein one or both of the plurality of at least one-bit neurons and the plurality of connections have a reduced bit precision; receiving a training data set, the training data set including audio data; training the deep neural network model using the training data set; and outputting a trained deep neural network model configured to output a predicted label of real-time audio data.

20 Claims, 11 Drawing Sheets

(51) Int. Cl.
G06N 3/04 (2006.01)
G10L 25/78 (2013.01)

(56) References Cited

U.S. PATENT DOCUMENTS

| | | | | |
|---|---|---|---|---|
| 2017/0286830 | A1* | 10/2017 | El-Yaniv | G06N 3/0454 |
| 2018/0315159 | A1* | 11/2018 | Ould-Ahmed-Vall | |
| | | | | G06F 9/3863 |
| 2018/0374477 | A1* | 12/2018 | Kim | G10L 15/063 |
| 2019/0012594 | A1* | 1/2019 | Fukuda | G06N 3/0454 |
| 2019/0236148 | A1* | 8/2019 | DeFelice | G06N 3/0472 |
| 2019/0303763 | A1* | 10/2019 | Bonnell | G06N 3/084 |
| 2019/0313187 | A1* | 10/2019 | Stoltze | H04R 3/04 |
| 2020/0380357 | A1* | 12/2020 | Yao | G06N 3/084 |

OTHER PUBLICATIONS

"Perceptual evaluation of speech quality (PESQ): An objective method for end-to-end speech quality assessment of narrow-band telephone networks and speech codecs", In ITU-T Recommendation, Feb. 23, 2001, 30 Pages.

"WebRTC", Retrieved From: https://webrtc.org/, Retrieved Date: Feb. 12, 2018, 2 Pages.

Hoffman, et al., "GSC-Based Spatial Voice Activity Detection for Enhanced Speech Coding in the Presence of Competing Speech", In Journal of IEEE Transactions on Speech and Audio processing, vol. 9, Issue 2, Mar. 2001, 5 Pages.

Benyassine, et al., "A Silence Compression Scheme for Use With G.729 Optimized for V.70 Digital Simultaneous Voice And Data Applications", In Proceedings of the IEEE Communications Magazine, vol. 35, Issue 9, Sep. 1997, pp. 64-73.

Courbariaux, et al., "BinaryNet: Training Deep Neural Networks with Weights and Activations Constrained to +1 or-1", In Journal of Computing Research Repository, Feb. 9, 2016, 9 Pages.

Eyben, et al., "Real-Life Voice Activity Detection with LSTM Recurrent Neural Networks and an Application to Hollywood Movies", In Proceedings of the IEEE International Conference on Acoustics, Speech and Signal Processing, May 26, 2013, 5 Pages.

Gupta, et al., "Deep Learning with Limited Numerical Precision", In Proceedings of the 32nd International Conference on Machine Learning, Jun. 7, 2015, pp. 1-10.

Hubara, et al., "Binarized Neural Networks", In Proceedings of the 30th Conference on Neural Information Processing Systems, Feb. 8, 2016, pp. 1-9.

Hughes, et al., "Recurrent Neural Networks for Voice Activity Detection", In Proceedings of the IEEE International Conference on Acoustics, Speech and Signal Processing, May 26, 2013, pp. 7378-7382.

Ko, et al., "Adaptive weight compression for memory-efficient neural networks", In Proceedings of the Conference on Design, Automation & Test in Europe, Mar. 27, 2017, pp. 199-204.

Na, et al., "Speeding Up Convolutional Neural Network Training with Dynamic Precision Scaling and Flexible Multiplier-Accumulator", In Proceedings of the International Symposium on Low Power Electronics and Design, Aug. 8, 2016, 6 Pages.

Ramírez, et al., "Improved Voice Activity Detection Using Contextual Multiple Hypothesis Testing for Robust Speech Recognition", In Journal of IEEE Transactions on Audio, Speech & Language Processing, vol. 15, Issue 8, Nov. 2007, pp. 2177-2189.

Sohn, et al., "A Statistical model-based voice activity detection", In Journal of IEEE signal processing letters, vol. 6, Issue 1, Jan. 1999, pp. 1-3.

Sohn, et al., "A voice activity detector employing soft decision based noise spectrum adaptation", In Proceedings of the IEEE International Conference on Acoustics, Speech and Signal Processing, vol. 1, May 12, 1998, 4 Pages.

Song, et al., "C-brain: a deep learning accelerator that tames the diversity of CNNs through adaptive data-level parallelization", In Proceedings of the 53rd Annual Design Automation Conference, Jun. 5, 2016, 6 pages.

Tang, et al., "How to train a compact binary neural network with high accuracy?", In Proceedings of the Thirty-First AAAI Conference on Artificial Intelligence, Feb. 13, 2017, pp. 2625-2631.

Tashev, et al., "DNN-based Causal Voice Activity Detector", In Proceedings of the Information Theory and Applications Workshop, Feb. 2, 2016, 5 Pages.

Tashev, et al., "Unified Framework for Single Channel Speech Enhancement", In Proceedings of the IEEE Pacific Rim Conference on Communications, Computers and Signal Processing, Aug. 23, 2009, 6 Pages.

Wang, et al., "Accelerating Convolutional Neural Networks for Mobile Applications", In Proceedings of the ACM on Multimedia Conference, Oct. 15, 2016, pp. 541-545.

Wu, et al., "Quantized Convolutional Neural Networks for Mobile Devices", In Journal of Computing Research Repository, Dec. 2015, 11 Pages.

Xu, et al., "An Experimental Study on Speech Enhancement Based on Deep Neural Networks", In Journal of IEEE Signal Processing Letters, vol. 21, Issue 1, Jan. 2014, pp. 65-68.

Yu, et al., "An introduction to computational networks and the computational network toolkit", In Microsoft Technical Report MSR-TR-2014-112, Aug. 2014, 150 Pages.

Zhang, et al., "Boosting Contextual Information for Deep Neural Network Based Voice Activity Detection", In Journal of IEEE/ACM Transactions on Audio, Speech and Language Processing, vol. 24, Issue 2, Feb. 1, 2016, pp. 252-264.

Zhang, et al., "Deep Belief Networks Based Voice Activity Detection", In Journal of IEEE Transactions on Audio, Speech and Language Processing, vol. 21, Issue 4, Apr. 2013, pp. 697-710.

Zhang, et al., "Denoising Deep Neural Networks Based Voice Activity Detection", In Proceedings IEEE International Conference on Acoustics, Speech and Signal Processing, May 26, 2013, 5 Pages.

Mak, et al., "A Study of voice activity detection techniques for NIST speaker recognition evaluations", In Journal of Computer Speech & Language, vol. 28, Issue 1, May 19, 2013, 34 Pages.

Hwon Ko, J. et al., "Precision Scaling of neural Netowrks for Efficient Audio Processing," 31st Conference on Neural Information Processing Systems (NIPS 2017), Long Beach, CA, pp. 1-5.

* cited by examiner

SYSTEMS, METHODS, AND COMPUTER-READABLE MEDIA FOR IMPROVED REAL-TIME AUDIO PROCESSING

TECHNICAL FIELD

The present disclosure relates to audio processing that improves real-time audio enhancement and detection. Specifically, the present disclosure relates to real-time audio processing using machine learning, such as neural networks, to improve detection of speech and noise in audio data.

INTRODUCTION

In the audio processing field, voice-activity detection ("VAD") and speech enhancement may be important front-end components of various audio processing systems. For example, VAD and speech enhancement enable an audio processing system to process only the speech segments of input audio samples with improved quality. As discussed below, deep-learning technologies allow VAD and speech enhancement approaches to rely on deep neural networks ("DNNs") and result in improved performance over conventional methods. However, due to the inherent complexity of DNNs, such as high computation and memory demand, there is a critical challenge in using DNNs for real-time speech processing.

Certain VAD algorithms, not utilizing DNNs, may be based on statistical signal processing that makes strong assumptions on distributions of speech and background noise. Further, other VAD algorithms may also be improved with an addition of speech presence probability estimation. Additionally, a hangover scheme with a simple hidden Markov model (HMM) may be added to improve performance.

Other VAD algorithms based on a Gaussian mixture model, such as WebRTC, provide a delay-sensitive methodology for web-based interactions. However, certain audio processing algorithms may not yet have reached levels that are routinely expected by modern applications, such as less than a 5% error rate. Further, certain speech processing algorithms performance limitation may be attributed to one or more factors: (1) difficulty of finding an analytical form of speech-presence probability, and/or (2) not having enough parameters that capture global signal distributions. Accordingly, there is a need for audio processing algorithms that provide improved error rates, provide lower delay, increased performance, and/or lower computation and memory resource demand.

While the present disclosure specifically discusses audio processing, aspects of the present disclosure may be applicable not only to audio processing, such as voice-activity detection ("VAD") and speech enhancement, but may also be applicable to regressive processing and classification problems.

SUMMARY OF THE DISCLOSURE

According to certain embodiments, systems, methods, and computer-readable media are disclosed for improved real-time audio processing.

According to certain embodiments, a computer-implemented method for improved real-time audio processing is disclosed. One method comprising: constructing a deep neural network model, including a plurality of at least one-bit neurons, configured to output a predicted label of audio data, the plurality of at least one-bit neurons arranged in a plurality of layers, including at least one hidden layer, and being connected by a plurality of connections, each connection having at least a one-bit weight, wherein one or both of the plurality of at least one-bit neurons and the plurality of connections have a reduced bit precision; receiving a training data set, the training data set including audio data; training the deep neural network model using the training data set; and outputting a trained deep neural network model configured to output a predicted label of real-time audio data.

According to certain embodiments, a system for improved real-time audio processing is disclosed. One system including: a data storage device that stores instructions for improved real-time audio processing; and a processor configured to execute the instructions to perform a method including: constructing a deep neural network model, including a plurality of at least one-bit neurons, configured to output a predicted label of audio data, the plurality of at least one-bit neurons arranged in a plurality of layers, including at least one hidden layer, and being connected by a plurality of connections, each connection having at least a one-bit weight, wherein one or both of the plurality of at least one-bit neurons and the plurality of connections have a reduced bit precision; receiving a training data set, the training data set including audio data; training the deep neural network model using the training data set; and outputting a trained deep neural network model configured to output a predicted label of real-time audio data.

According to certain embodiments, a computer-readable storage device storing instructions that, when executed by a computer, cause the computer to perform a method for improved real-time audio processing is disclosed. One method of the computer-readable storage devices including: constructing a deep neural network model, including a plurality of at least one-bit neurons, configured to output a predicted label of audio data, the plurality of at least one-bit neurons arranged in a plurality of layers, including at least one hidden layer, and being connected by a plurality of connections, each connection having at least a one-bit weight, wherein one or both of the plurality of at least one-bit neurons and the plurality of connections have a reduced bit precision; receiving a training data set, the training data set including audio data; training the deep neural network model using the training data set; and outputting a trained deep neural network model configured to output a predicted label of real-time audio data.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1:
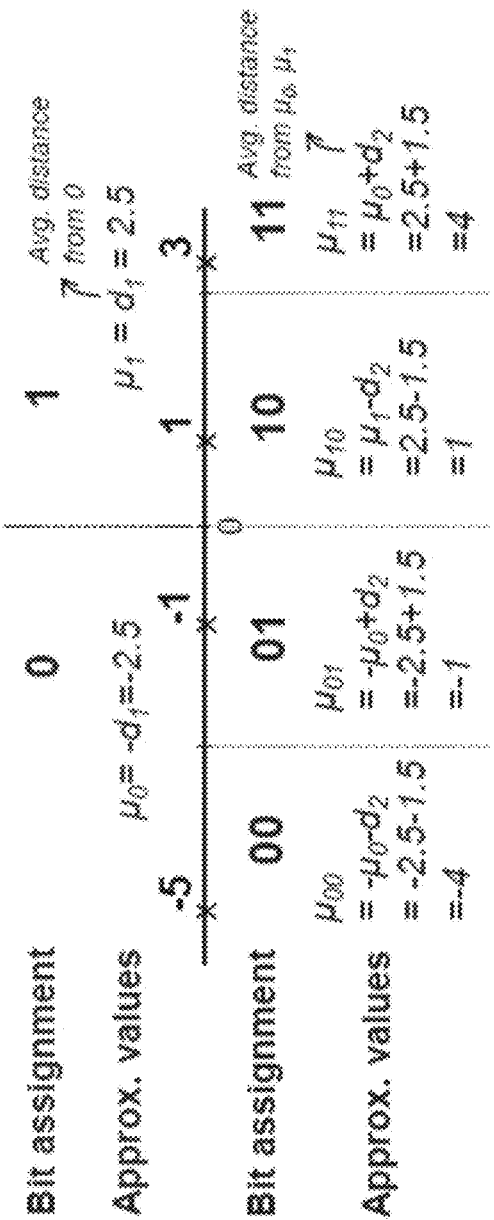
FIG. 1 depicts an exemplary bit assignment using precision scaling, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a methodology to efficiently scale precision of neural networks for audio processing tasks. For applications that require efficient speech processing, fast and robust voice-activity detection ("VAD") may be require. VAD includes a form of audio processing in which identifying presence of speech in an audio sample that includes a mixture of speech and noise. VAD's ability to filter out non-speech segments from an audio sample may be an important front-end component of various speech processing systems, such as automatic speech recognition and speaker identification.

Deep-learning technologies, such as deep neural networks ("DNNs") may provide for improved voice detection with competitive accuracies, as compared to use of other VAD algorithms. However, use of DNNs may introduce computational delays and latency of over a 100 ms, which may be unacceptable for certain real-time speech processing.

In embodiments of the present disclosure described below, lowering a precision of neural network weights and/or neurons may improve one or both of accuracy and/or a delay of audio processing, including speech processing, such as voice-activity detection. Further, adjustments to a structure of a neural network may be implement to accommodate new quantization levels.

According to embodiments of the present disclosure, deep-neural networks may implicitly model data distributions with high-dimensionality. DNNs may also allow fusion of multiple features and separate speech from fast-varying, non-stationary noises. Thus, DNNs may provide improved performance of voice-activity detection.

However, performance of neural network models may suffer when applied to unseen test scenarios. Further, DNNs may be computational complex and may have a high memory demand, which may increase significantly depending on the depth and breadth of the deep neural-network. For example, on an Intel CPU, even a simple 3-layer DNN may incur a processing delay of 138 ms per frame, as shown below in Table 1 below. In such an instance, this may be due to the 3,073 kOPs of computation and 6 MB of memory required to evaluate every frame of audio data. Thus, overheads may be unacceptable in real-time audio processing applications. However, computational complexity and high memory demand may be address by optimizing neural network architectures.

According to embodiments of the present disclosure, to lower computational complexity and memory demand of a deep neural network, one or more optimization methods may be implemented. At least one embodiment of the present disclosure implements a precision-scaling technique that represents weights of connections and/or neurons of the deep neural network with a reduced number of bits. In one example, a binarized (1-bit) neural network may be implemented. However, any number of weight bits and neuron bits may be implemented. As discussed below in regard to FIGS. 3A and 3B, an effect of various bit-width pairs of weights and neurons on the audio processing delay and the detection accuracy of VAD is shown.

According to embodiments of the present disclosure, DNNs for VAD may be designed by scaling the precision of data representation within the neural network. To minimize bit-quantization error, a bit-allocation scheme may be based on a global distribution of values of audio data. An optimal pair of weight/neuron bits may be determined by analyzing the impact of bit widths on both the processing performance and delay. Additionally, to reduce the processing delay, the neural network structure may be optimized. Further, detection accuracy of a proposed DNN model may be compared with other approaches by using a test data set of data with unseen noise scenarios.

As discussed below, a deep neural network with 1-bit weights and 2-bit neurons may reduce an audio processing delay by 30× with 3.12% increase in accuracy compared to a deep neural network with 32-bit weights and 32-bit neurons. Further, by optimizing a number of layers in a deep neural network, a standard VAD algorithm, such as WebRTC VAD, may be outperformed by the optimized deep neural network with a 87× lower delay and 6.8% lower error rate.

Table 1 depicts a comparison of computation/memory demand and performance of a standard VAD algorithm, such as WebRTC, and DNNs-based VADs, according to embodiments of the present disclosure. DNN models, according to embodiments of the present disclosure, may be a baseline structure or an optimized structure. Additionally, two different precisions are shown in Table 1, where Wi/Nj indicates i bits for weights and j bits for neurons. A reference value for the kOPs/frame and memory comparison is the W32/N32 DNN, and the reference value for the processing delay and VAD error rate comparison is the standard VAD algorithm.

According to embodiments of the present disclosure, one or more precision-scaling methods may be implemented. One precision-scaling method may include a rounding scheme with a round-to-nearest or a stochastic rounding mode. However, such a precision-scaling method may result in a large quantization error, as the precision-scaling method may not consider a global distribution of the values.

According to embodiments of the present disclosure, another precision-scaling method may be based on residual error mean binarization. In residual error mean binarization, each bit assignment may be associated with a corresponding approximate value that is determined by a distribution of the original values. FIG. 1 depicts an exemplary bit assignment using precision scaling, according to embodiments of the present disclosure. As shown in FIG. 1, four input values (−5, −1, 1, 3) are represented by 2-bit precision (00, 01, 10, 11) which are approximated to output values (−4, −1, 1, 4).

Figure 2:
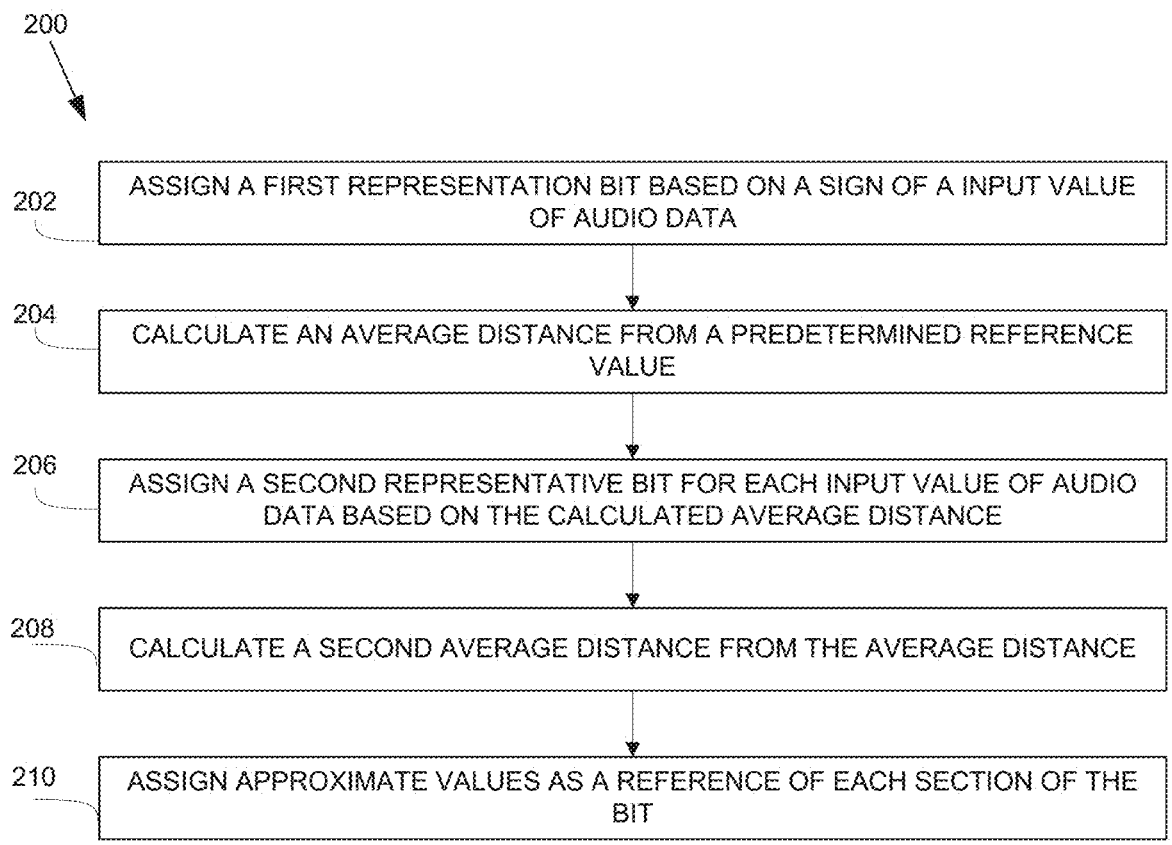
FIG. 2 depicts an exemplary method 200 for performing precision-scaling by implementing a bit assignment on input audio data based on residual error mean binarization, according to embodiments of the present disclosure.

FIG. 2 depicts an exemplary method 200 for performing precision-scaling by implementing a bit assignment on input audio data based on residual error mean binarization, according to embodiments of the present disclosure. Method 200 may begin at step 202 in which a first representation bit, such as a most significant bit, is assigned based on a sign of a input value of audio data. For example, for input values being positive values, a 1 is assigned to the most significant bit position, and for input values being negative values, a 0 assigned to the most significant bit position. Thus, a first representative bit for each input value of audio data of a data set may be assigned based on a sign of each input value. Alternatively, if input values are all positive, the method may begin at step 204.

Next, at step 204, an average distance from a predetermined reference value may be calculated. The predetermined reference value may be 0, or any other predefined number. For example, the average distance of the four input values (−5, −1, 1, 3), as shown in FIG. 1, is 2.5, as the total distance from 0 is 5+1+1+3, which is 10, and divided by 4, which is the number of values. Accordingly, an approximate value for each bit assignment may be computed by adding the average distance to a predetermined reference value for each significant bit position being 1 (1 in the first bit

TABLE 1

| | | Deep Neural Networks | | |
|---|---|---|---|---|
| | Standard | Baseline Neural Network (1729-512-512-512-257) | | Optimized Neural Network (256-32-257) |
| | VAD Algorithm | Weight Bits/Neuron Bits W32/N32 | Weight Bits/Neuron Bits W1/N2 | |
| kOPs/frame | — | 3073 | 144 (21× ↓) | 1.5 (2048× ↓) |
| Memory (MB) | — | 6.0 | 0.19 (32× ↓) | 0.13 (46× ↓) |
| Processing delay/sample (ms) | 17 | 138 (8.2× ↑) | 4.7 (3.6× ↓) | 0.2 (87× ↓) |
| VAD error rate (%) | 20.88 | 8.20 (12.68% ↓) | 11.34 (9.54% ↓) | 14.10 (6.8% ↓) | assignment), or subtracting the average distance from the predetermined reference value for each significant bit position being 0 (0 in the first bit assignment).

Then, at step 206, a second representative bit for each input value of audio data of the data set may be assigned based on the calculated average distance and/or input value of audio data of the data set.

For next bit assignment (least significant bit for 2-bit precision), at step 208, a second average distance from the average distance may be calculated. Thus, in this example, the average distance may be 2.5, and the second average distance of the four input values (−5, −1, 1, 3), as shown in FIG. 1, is 1.5, as the total distance of each of the four input values (−5, −1, 1, 3) from 2.5 is 2.5+1.5+1.5+0.5, which is 6, and divided by 4, which is the number of values. Accordingly, a second average distance may be calculated based on the calculated average distance.

Then, at step 210, approximate values may be assigned as a reference of each section of the bit. Thus, for each input value of a data set, an approximate value may be assigned as a reference of each section of the assigned first representative bit and second representative bit based on the second average distance. As shown in FIG. 1, for the input values (−5, −1, 1, 3) represented by 2-bit precision, the approximate values are (−4, −1, 1, 4). This precision-scaling method may allocate a same number of values in each bit assignment bin to minimize the quantization error. While the precision-scaling method described above is of 2-bit precision, such precision-scaling may be implemented with any amount of bit precision.

Figure 3A:
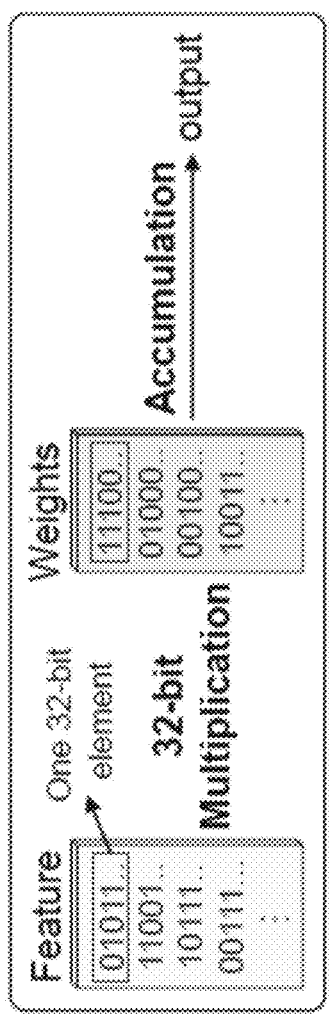
FIGS. 3A and 3B depict an output feature computation with 32-bit weights and neurons compared to 1-bit weights and neurons, according to embodiments of the present disclosure.
Figure 3B:
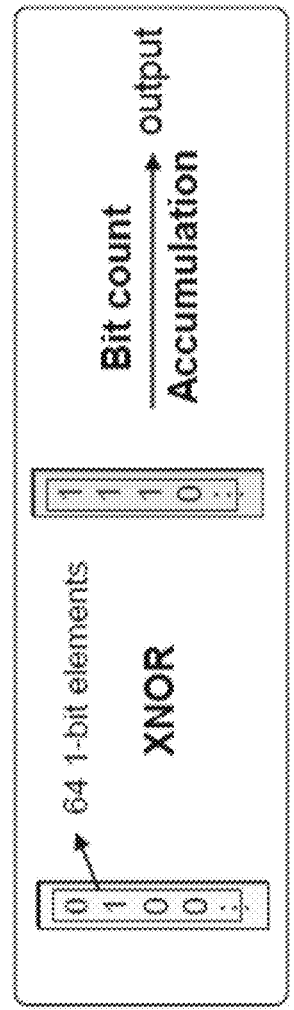

According to embodiments of the present disclosure, an estimated ideal inference speedup due to the reduced bit precision may be calculated by counting a number of operations in each bit-precision case. FIGS. 3A and 3B depict an output feature computation with 32-bit weights and neurons compared to 1-bit weights and neurons, according to embodiments of the present disclosure. As shown in FIG. 3A, in a 32-bit neural network system, two operations (32-bit multiplication and accumulation) per one pair of input feature and weight elements may be needed to compute the output feature. When the neural network has 1-bit neurons and weights of connections, as shown in FIG. 3B, multiplication may be replaced with XNOR and bit count operations, which may be performed in sets of operations per CPU cycle, such as sets of 64 operations per CPU cycle. According to embodiments of the present disclosure, three operations per 64 elements may be needed, which translates to a 42.7× speedup. When a neural network has 2 or more bit neurons and weights of connections, an operation for all the combinations of the bits may be performed. Therefore, an ideal speedup may be computed as:

$$\text{Speedup} = \max\left(1, \frac{128}{3 \times \text{weight bit width} \times \text{neuron bit width}}\right). \quad (1)$$

Figure 4A:
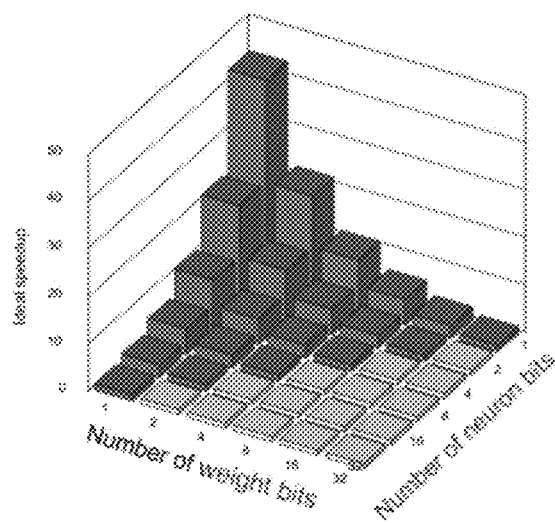
FIGS. 4A and 4B depict a speedup due to reduced bit precision of neurons and weights, according to embodiments of the present disclosure.
Figure 4B:
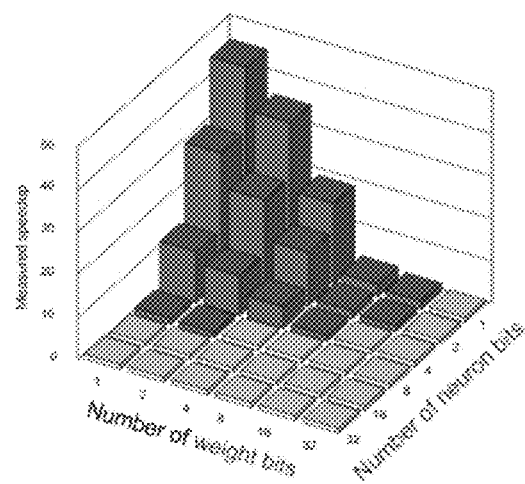

FIGS. 4A and 4B depict a speedup due to reduced bit precision of neurons and weights of connections, according to embodiments of the present disclosure. As shown in FIG. 4A, dark gray bars may indicate an ideal speedup of greater than 1 and light gray bars may indicate no speed up. As shown in FIG. 4B, dark gray bars may indicate an measured speedup of greater than 1 and light gray bars may indicate no speed up according to an ideal computed speedup. In FIG. 4A, the ideal speedup may decrease as weight/neuron bit width is reduced. For example, when the product of the two bit-precision values is larger than 42.7, there is no advantage from bit truncation since XNOR and bit-count operations may take more computation than regular 32-bit multiplication. The above-described precision-scaling methodology may be implemented within a neural network framework, and actual inference speedup that was attained on an Intel processor may be measured, as shown in FIG. 4B. The measured speedup may be similar to or even higher than the ideal values because of the benefits of loading the low precision weights, as a bottleneck of the neural network framework matrix multiplication may be memory access. FIGS. 4A and 4B also indicates that reducing weight bits may lead to higher speedup than reducing neuron bits since the weights may be pre-quantized, which may make memory loads more efficient.

Figure 5:
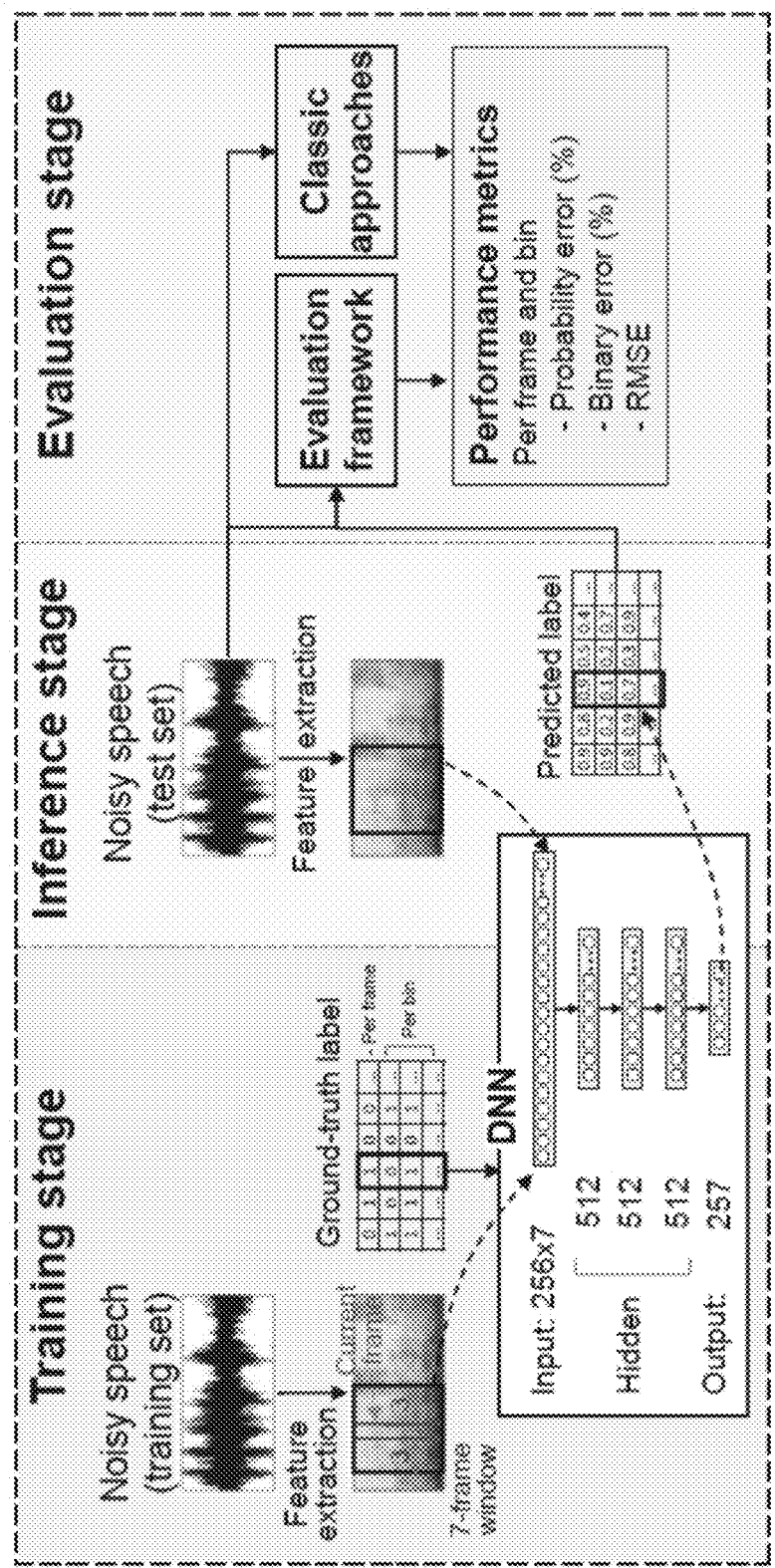
FIG. 5 depicts a neural network framework, according to embodiments of the present disclosure.

FIG. 5 depicts a neural network framework, according to embodiments of the present disclosure. As shown in FIG. 5, those skilled in the art will appreciate that neural networks may be conducted in regard to a model and may include phases: model creation (neural network training), model validation (neural network testing), and model utilization (neural network evaluation), though these phases may not be mutually exclusive. According to embodiments of the present disclosure, neural networks may be implemented through training, inference, and evaluation stages. Noisy speech spectrogram windows of 16 ms and 50% overlap with a Hann weighting may be utilized, along with corresponding ground-truth labels for deep neural network training and inference. For a baseline deep neural network, the model may have input layer of 1792 neurons (7*256), three intermediate (hidden) layers each of 512 neurons, and an output layer having 257 neurons. The input feature to the baseline DNN may be prepared by flattening symmetric 7-frame windows of a spectrogram. The output layer of 257 neurons where one neuron may be for a speech probability for an entire frame and the other 256 neurons may be for frequency bins. At the end of each layer, a function, such as tan h non-linearity function, may be applied.

At least one server may execute a machine learning component of the audio processing system described herein. As those skilled in the art will appreciate, machine learning may be conducted in regard to a model and may include at least three phases: model creation, model validation, and model utilization, though these phases may not be mutually exclusive. As discussed in more detail below, model creation, validation, and utilization may be on-going processes of a machine learning.

For the machine learning, the model creation phase may involve extracting features from noisy speech of a training data set. The machine learning component may monitor the ongoing audio data to extract features from noisy speech. As those skilled in the art will appreciate, these extracted features and/or other data may be derived from statistical analysis and machine learning techniques on large quantities of data collected over time based on patterns. Based on the observations of this monitoring, the machine learning component may create a model (i.e., a set of rules or heuristics) for extracting features from audio data.

The baseline deep neural network may be trained to minimize squared error between ground-truth and predicted labels. Each training may involve 100 epochs with a batch size of 400. The baseline deep neural network may be trained with the reduced bit precision from scratch, rather than re-training the baseline deep neural network after bit quantization.

During a second phase of machine learning, the created model may be validated for accuracy. During this phase, the machine learning component may monitor a noisy speech from a test data set, extract features from the test data set, and compare those extracted features against predicted labels made by the model. Through continued tracking and comparison of this information and over a period of time, the machine learning component may determine whether the model accurately predicts which parts of the audio data are likely to be noise and/or speech. This validation is typically expressed in terms of accuracy: i.e., what percentage of the time does the model predict the labels. Information regarding the success or failure of the predictions by the model may be fed back to the model creation phase to improve the model and, thereby, improve the accuracy of the model.

During the inference phase, noisy spectrogram from a test dataset may be applied to the trained baseline deep neural network to generate the predicted labels. The predicted labels may then be compared with the ground-truth labels to compute performance metrics including probability/binary detection error and mean-square error. Probability/binary detection error may be defined as an average difference between the ground-truth labels and probability/binary decision labels for each frame or frequency bin. Further, binary decision may be determined by comparing the probability with a predetermined fixed threshold, such as, for example 0.5.

For performance comparison, performance metrics of a classic VAD algorithm and the standard VAD algorithm, such as WebRTC VAD, are obtained. Table 2, as shown below, provides a comparison of voice detection error rates with different approaches and test sets. Probability error rates of the standard VAD algorithm are omitted since it only provides the binary-detection result.

corded noise at different signal-to-noise ratios ("SNRs") ranging between 0-30 dB and distances from a microphone ranging between 1-3 meters. Each clean speech file included 10 sample utterances that were collected from voice queries, such as to Microsoft Windows Cortana Voice Assistant. Further, noise files contained 25 types of recordings in the real world. Using noise files with different noise scenarios, 150 files of the test data set with unseen noise were created.

Table 2 shows a comparison of per-frame detection accuracy for the regular test data set and the test data set with unseen noise. With the regular test data set, the baseline 32-bit deep neural network may provide a higher detection accuracy than the classic VAD Algorithm and the standard VAD algorithm. Further, the deep neural network with 1-bit weights and neurons achieved lower detection error than the classic VAD algorithm and the standard VAD algorithm.

Figures 6A, 6B, 6C, 6D, 6E:
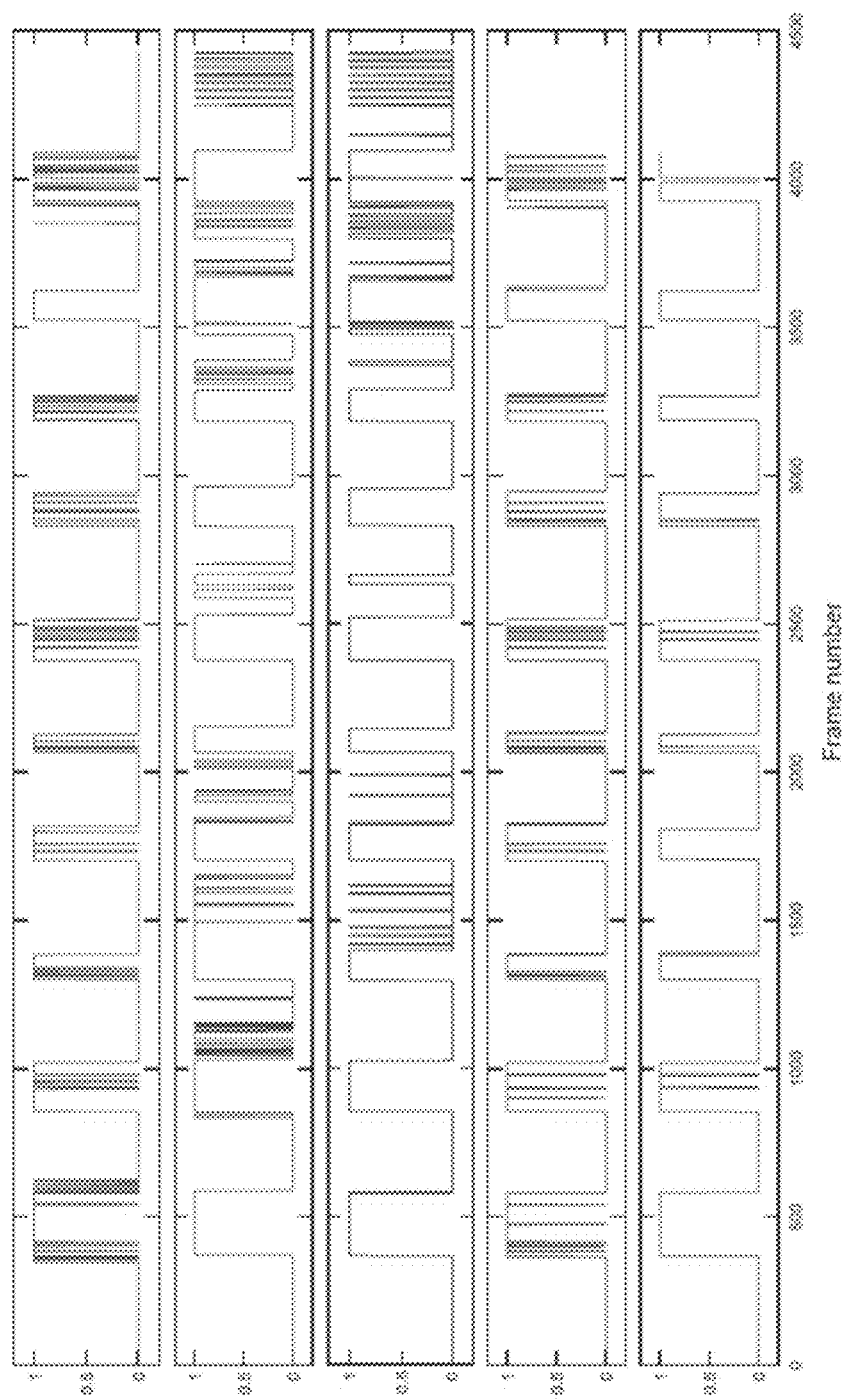
FIGS. 6A-6E depict binary detection output from each VAD method for a sample noisy speech file that has similar error rates to the average error rates, according to embodiments of the present disclosure.

FIGS. 6A-6E depict binary detection output from each VAD method for a sample noisy speech file that has similar error rates to the average error rates, according to embodiments of the present disclosure. Specifically, FIG. 6A shows a ground-truth label, FIG. 6B shows the classic VAD algorithm voice detection output, FIG. 6C shows the standard VAD algorithm, such as WebRTC VAD, voice detection output, FIG. 6D shows the deep neural network with 32-bit weights/neurons voice detection output, and FIG. 6E shows the deep neural network with 1-bit weights/neurons voice detection output.

As shown in FIGS. 6D and 6E, the 32-bit and 1-bit deep neural network approaches may have a similar detection output as the ground truth. However, the classic VAD algorithm and the standard VAD algorithm are shown to be

TABLE 2

|  |  | Classic | Standard | Deep Neural Network | |
|  | Model | VAD Algorithm | VAD Algorithm | Weight Bits/Neuron Bits W32/N32 | Weight Bits/Neuron Bits W1/N1 |
| --- | --- | --- | --- | --- | --- |
| Regular Test Data Set | RMSE | 0.411 | 0.408 | 0.268 | 0.389 |
|  | Probability (%) | 24.24 | — | 5.96 | 21.63 |
|  | Binary (%) | 24.90 | 20.46 | 5.55 | 14.95 |
| Test Data Set w/ Unseen Noise | RMSE | 0.343 | 0.389 | 0.228 | 0.312 |
|  | Probability (%) | 17.89 | — | 15.32 | 24.51 |
|  | Binary (%) | 18.08 | 20.88 | 8.20 | 17.76 |

A third phase of machine learning may be based on a model that is validated to a predetermined threshold degree of accuracy. For example, a model that is determined to have at least a 50% accuracy rate may be suitable for the utilization phase. According to embodiments of the present disclosure, during this third, utilization phase, the machine learning component may extract features from audio data where the model suggests that a noise and/or speech is present. Upon encountering speech and/or other data in the audio data, the model suggests that speech may be present and may store as segments of data. Of course, information based on the confirmation or rejection of the various stored segments of data may be returned back to the previous two phases (validation and creation) as data to be used to refine the model in order to increase the model's accuracy.

The data sets, as used herein, were created of 750 files, 150 files, and 150 files of training data set, validation data set, and test data set, respectively, by convolving clean speech with room impulse responses and adding pre-reprone to false positives, which may lead to a higher detection error than either of the deep neural network models.

Further, Table 2 indicates that detection performance of the classic VAD algorithm and the standard VAD algorithm are not significantly affected by the dependency of noise types in the training data set and test data set. However, the 32-bit and 1-bit deep neural network approaches may produce a high error rate with the unseen test data set since both the 32-bit and 1-bit deep neural network approaches may deal with noise types differently from the noise types used for training the deep neural networks. Nevertheless, as shown in Table 2, binary detection error of the 1-bit deep neural network is lower than the classic VAD algorithm and the standard VAD algorithm even with the test data set with unseen noise.

Figure 7A:
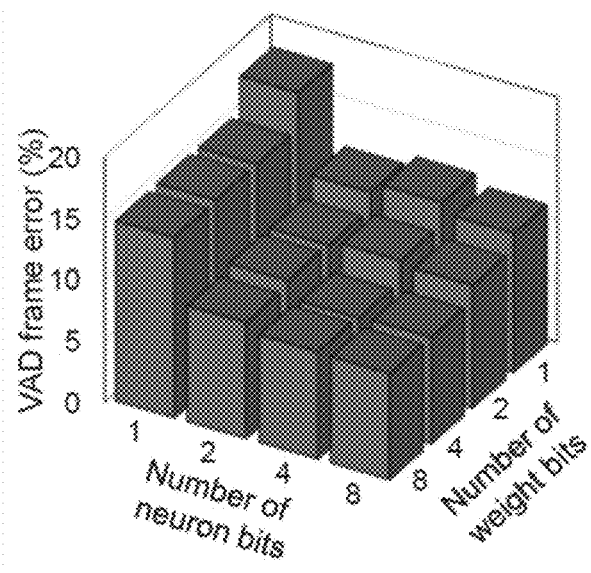
FIGS. 7A and 7B depict VAD algorithm performance of deep neural networks with different pairs of weight/neuron bit precision, according to embodiments of the present disclosure.
Figure 7B:
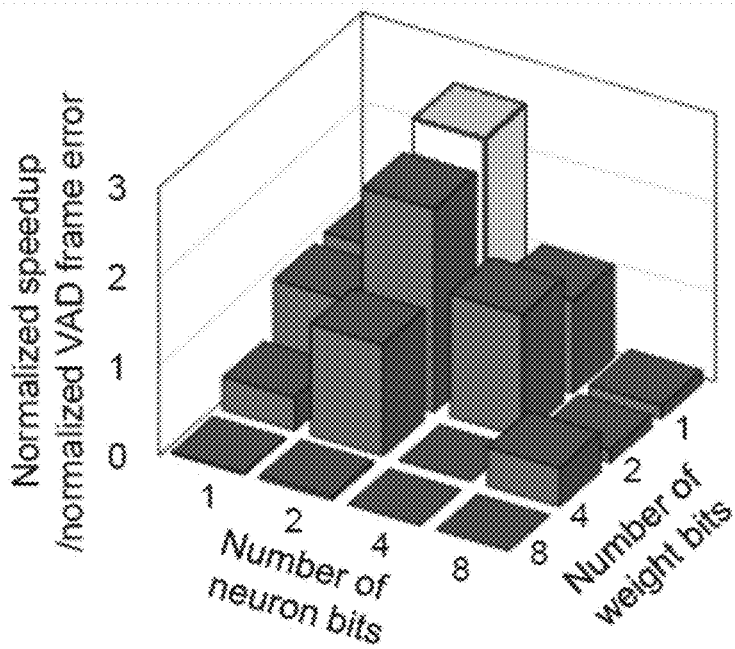

In order to further improve audio processing, such as providing a practical solution that makes a detection on each frame under the various noise types, frame-level binary detection error on the test data set with unseen noise may be used for analysis. FIGS. 7A and 7B depict VAD algorithm performance of deep neural networks with different pairs of weight/neuron bit precision, according to embodiments of the present disclosure. In particular, FIG. 7A shows frame-level binary detection error of deep neural network models with different weight/neuron bit precision pairs. As shown in FIG. 7A, the frame-level binary detection error increases as lower bit precision is used. From this information, accuracy is more sensitive to neuron bit reduction than weight bit reduction may be observed. Thus, in choosing an optimal pair of weight/neuron bit precision, both detection accuracy and processing delay may be considered. Therefore, a new metric computed by multiplying speedup and VAD error, with both of them normalized to lie in the range [0, 1] may be introduced. As shown in FIG. 7B, optimal bit-precision pair may be determined as 1-bit weights and 2-bit neurons (W1/N2). A light bar shown in FIG. 7B may indicate an optimal pair of bit precision (W1/N2).

The average processing delay per file of the different approaches may be measured based on their Python implementation and an Intel processor. Implementation of the classic VAD algorithm was based on MATLAB, and thus, the standard VAD algorithm, such as the WebRTC VAD algorithm, may be used to compare the processing delays. As shown in Table 1, the baseline 32-bit deep neural network required 138 ms per file, which was a higher delay than the standard VAD algorithm (17 ms). By scaling the precision of the deep neural network to W1/N2, as explained above, processing delay may be reduced by 30× (4.7 ms), which may be 3.6× lower than the standard VAD algorithm.

Figures 8A, 8B:
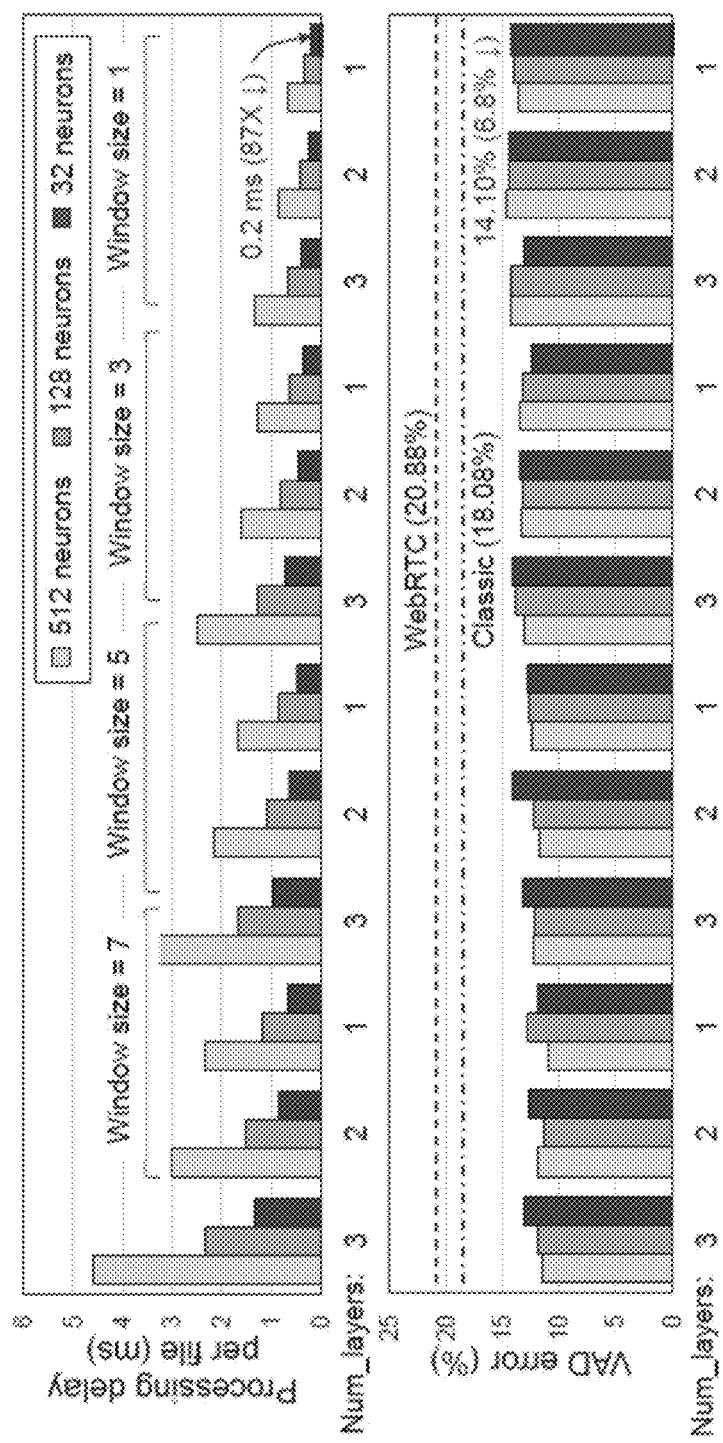
FIGS. 8A and 8B depict metrics of various adjustments to a deep neural network's structure, according to embodiments of the present disclosure.

According to embodiments of the present disclosure, processing delay may also be reduced by adjusting a deep neural network's structure. A deep neural network's structure may be adjusted by changing one or more of a number of layers, a number of neurons in each layer, and/or an input window size. FIGS. 8A and 8B depict metrics of various adjustments to a deep neural network's structure, according to embodiments of the present disclosure. Specifically, FIG. 8A depicts a processing delay per file, and FIG. 8B depicts a frame-level binary detection error. As shown in FIGS. 8A and 8B, a network size reduction may lead to a decrease in processing delay, as well as a reduction to VAD error. As determined from the FIGS. 8A and 8B, wide and shallow deep neural networks may provide better accuracy than narrow and deep neural networks at the same delay (e.g. a three layer, 128-neuron deep neural network compared to a one layer, 512-neuron deep neural network). Additionally, by reducing a deep neural network into one layer, 32-neuron and single-frame window, a W1/N2 deep neural network may be observed to outperform the standard VAD algorithm with 87× lower delay and 6.8% lower error rate.

By lowering a number of weight bits, computational demand may be reduced, and a size of a size of the weights may also be reduced. Such reduction in the number of weight bit may decrease an effective memory access latency and energy consumption. Additionally, because weights of the baseline 32-bit deep neural network may be around 6 MB (Table 1), the baseline 32-bit deep neural network may not fit into an on-chip cache of certain computing devices, such as a mobile devices. Thus the baseline 32-bit deep neural network may be stored in an off-chip memory, such as DRAM, where system throughput and energy may be dominated by the weight access. For the W1/N2 deep neural network, an entire set of weights of about 128 KB (Table 1) may be stored in the on-chip cache, and a reduction in energy and latency may be achieved.

Accordingly, embodiments described herein may provide a methodology to efficiently scale the precision of neural networks for a voice-activity detection task. Through a careful design-space exploration, a deep neural network model with optimal bit-precision values that reduces a processing delay by up to 30× or more with only a slight increase in the error rate may be demonstrated. By further optimizing a deep neural network structure, the deep neural network may outperform a state-of-the-art VAD, such as WebRTC, with a 87× lower delay and a 6.8% lower error rate.

While the present disclosure specifically discusses audio processing, aspects of the present disclosure may be applicable not only to audio processing, such as voice-activity detection ("VAD") and speech enhancement, but may also be applicable to regressive processing and classification problems. For example, aspects of the present disclosure may also improve classification tasks, such as source separation and microphone beam forming, as well as estimation tasks, such as acoustic echo cancellation.

As described above and below, embodiments of the present disclosure allow for reduction in computational complexity and memory demand, which may also reduce power consumption. Embodiments of the present disclosure may be implemented on mobile devices, such as Smartphones, tablets, and/or even wearable items, smart speakers, computers, laptops, car entertainment systems, etc.

Figure 9:
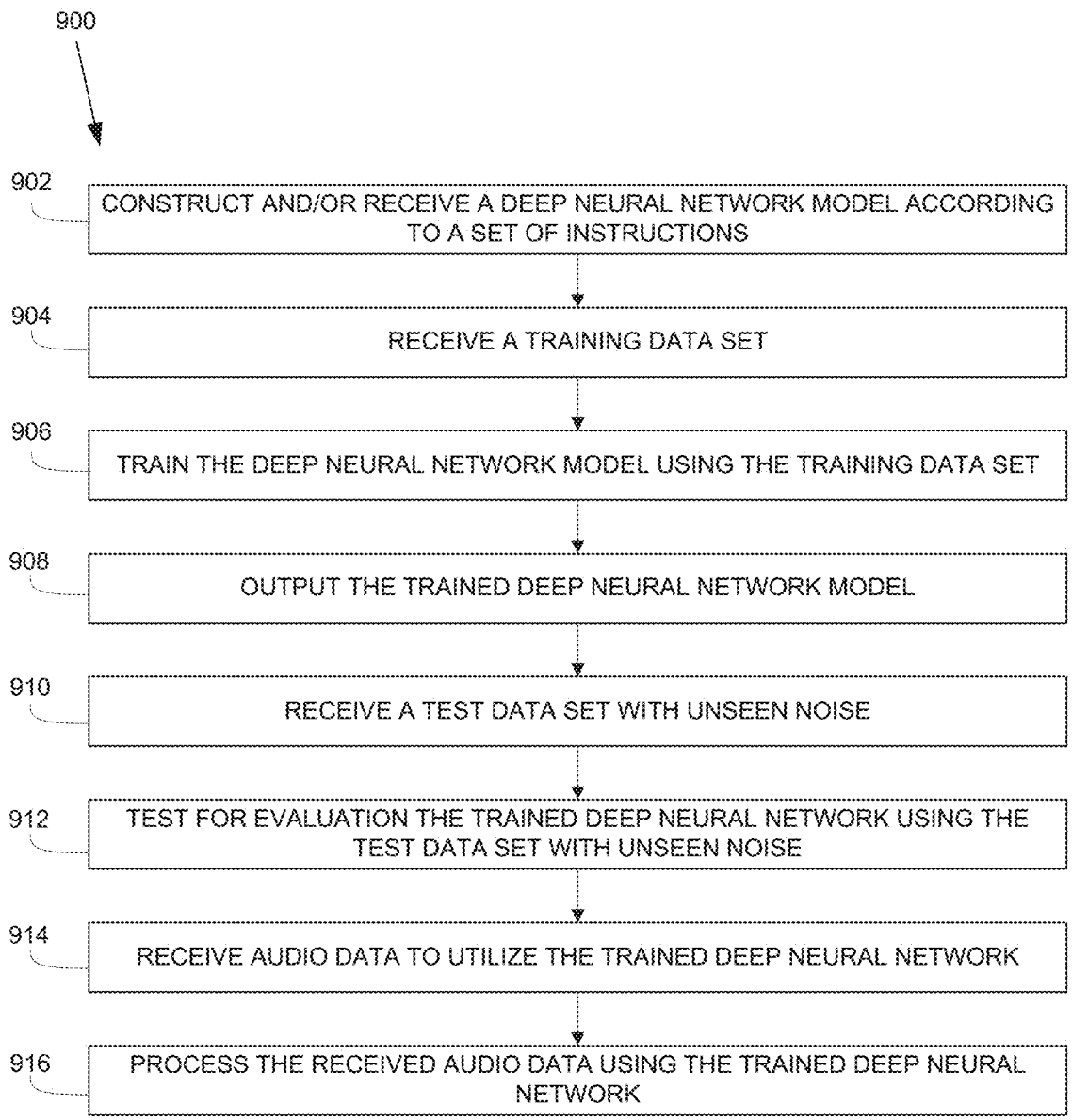
FIG. 9 depicts a method 900 for training a deep neural network for improved real-time audio processing, according to embodiments of the present disclosure.

FIG. 9 depicts a method 900 for training a deep neural network for improved real-time audio processing, according to embodiments of the present disclosure. Method 900 may begin at step 902, in which a deep neural network model may be constructed and/or received according to a set of instructions. The deep neural network model may include a plurality of at least one-bit neurons. The deep neural network model may be configured to output a predicted label of input audio data. The plurality of the at least one bit neurons may be arranged in a plurality of layers, including at least one hidden layer, and may be connected by connections. Each connection including an at least one-bit weight. One or both of the plurality of at least one-bit neurons and the plurality of connections may have a reduced bit precision.

In certain embodiments of the present disclosure, the deep neural network may comprise one of one hidden layer, two hidden layers, and three hidden layers. Further, in certain embodiments of the present disclosure, the connections include one-bit weights. Additionally, in certain embodiments of the present disclosure, the neurons are one of one-bit neurons and two-bit neurons. Yet even further, in certain embodiments of the present disclosure, the at least one hidden layer includes less neurons than an input layer of the deep neural network and an output later of the deep neural network. For example, the at least one hidden layer may include one of 32, 128, and 512 neurons.

Then, at step 904, a training data set may be received. The training data set may include audio data. However, embodiments of the present disclosure are not necessarily limited to audio data. The training data set may include one or more of image data, video data, textual content, genetic data, etc. The received training data set may include data that has been previously scaled for precision. Additionally, and/or alternatively, the received training data set may be scaled for precision.

At step 906, the deep neural network model may be trained using the training data set. Then, at step 908, the trained deep neural network model may be outputted. The trained deep neural network model may be used to output predicted label for audio data. The trained deep neural network model may include the plurality of at least one-bit neurons. The trained deep neural network model configured to output a predicted label of input audio data, such as real-time audio data. The plurality of the at least one bit neurons may be arranged in the plurality of layers, including the at least one hidden layer, and may be connected by connections. Each connection including the at least one-bit weight. In certain embodiments of the present disclosure, the deep neural network may comprise one of one hidden layer, two hidden layers, and three hidden layers. Further, in certain embodiments of the present disclosure, the connections include one-bit weights. Additionally, in certain embodiments of the present disclosure, the neurons are one of one-bit neurons and two-bit neurons. Yet even further, in certain embodiments of the present disclosure, the at least one hidden layer includes less neurons than an input layer of the trained deep neural network and an output later of the trained deep neural network. For example, the at least one hidden layer may include one of 32, 128, and 512 neurons.

At step 910, a test data set with unseen noise may be received. Alternatively, and/or additionally, using noise files with different noise scenarios, a test data set with unseen noise may be created. Further, embodiments of the present disclosure are not necessarily limited to audio data. The test data set with unseen noise may include one or more of image data, video data, textual content, genetic data, etc. The received test data set with unseen noise set may include data that has been previously scaled for precision. Additionally, and/or alternatively, the received test data set with unseen noise set may be scaled for precision.

Then, step 912, the trained deep neural network may then be tested for evaluation using the test data set with unseen noise. Further, once evaluated to pass a predetermined threshold, the trained deep neural network may be utilized. Additionally, in certain embodiments of the present disclosure, the step of method 900 may be repeated to produce a plurality of trained deep neural networks. The plurality of trained deep neural networks may then be compared to each other and/or other deep neural networks.

At step 914, the trained deep neural network may be utilized with audio data, such as real-time audio data. For example, audio data, such as real-time audio data may be received, and the audio data may include one or more audio frames represented in one of a time domain or a conversion domain. The audio data may be in a time domain, and may be subsequently converted into a frequency domain. For example, a time domain signal may be converted into several frequency dependent domains. Further, a time domain signal may be converted into one or more of conversion domains, such as one or more of a frequency domain, a modified complex lapped transform ("MCLT") domain, a mel-filter bank domain, etc. Further, the one or more conversion domains may further be converted into one or more conversion domains, such as one or more of a modulation domain, a cepstral domain, a mel-frequency cepstral coefficient ("MFCC") domain, a log-power frequency domain, etc.

Then, at step 916, the received audio data may be processed using the trained deep neural network. For example, the received audio data may be processed in segments, and each segment may include one or more frames of the received audio data. After processing the audio data, if the audio data is represented in a conversion domain, the audio data may be converted into the time domain.

Figure 10:
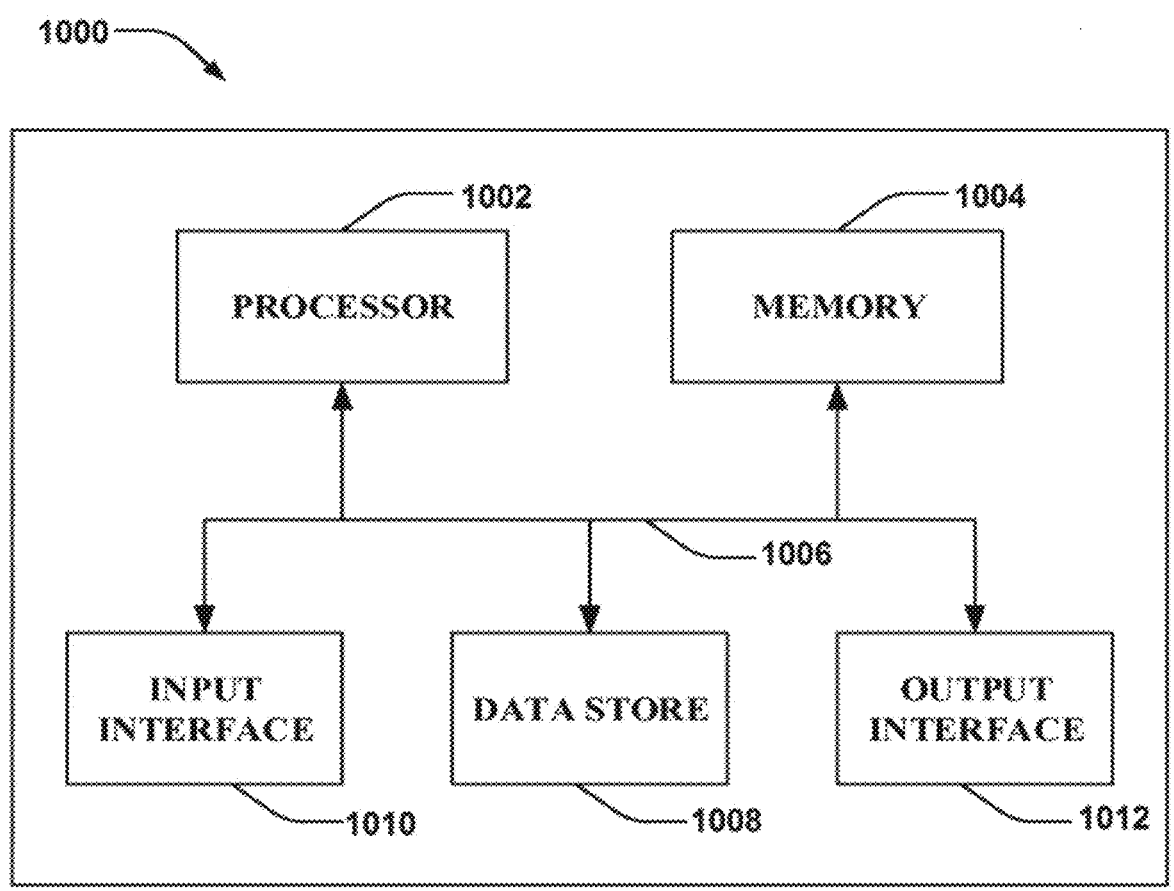
FIG. 10 depicts a high-level illustration of an exemplary computing device that may be used in accordance with the systems, methods, and computer-readable media disclosed herein, according to embodiments of the present disclosure.

FIG. 10 depicts a high-level illustration of an exemplary computing device 1000 that may be used in accordance with the systems, methods, modules, and computer-readable media disclosed herein, according to embodiments of the present disclosure. For example, the computing device 1000 may be used in a system that processes data, such as audio data, using a deep neural network, according to embodiments of the present disclosure. The computing device 1000 may include at least one processor 1002 that executes instructions that are stored in a memory 1004. The instructions may be, for example, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store data, audio, one or more deep neural networks, and so forth.

The computing device 1000 may additionally include a data store, also referred to as a database, 1008 that is accessible by the processor 1002 by way of the system bus 1006. The data store 1008 may include executable instructions, data, examples, features, etc. The computing device 1000 may also include an input interface 1010 that allows external devices to communicate with the computing device 1000. For instance, the input interface 1010 may be used to receive instructions from an external computer device, from a user, etc. The computing device 1000 also may include an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 1000 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for example, several devices may be in communication by way of a network connection and may collectively perform tasks described as being performed by the computing device 1000.

Figure 11:
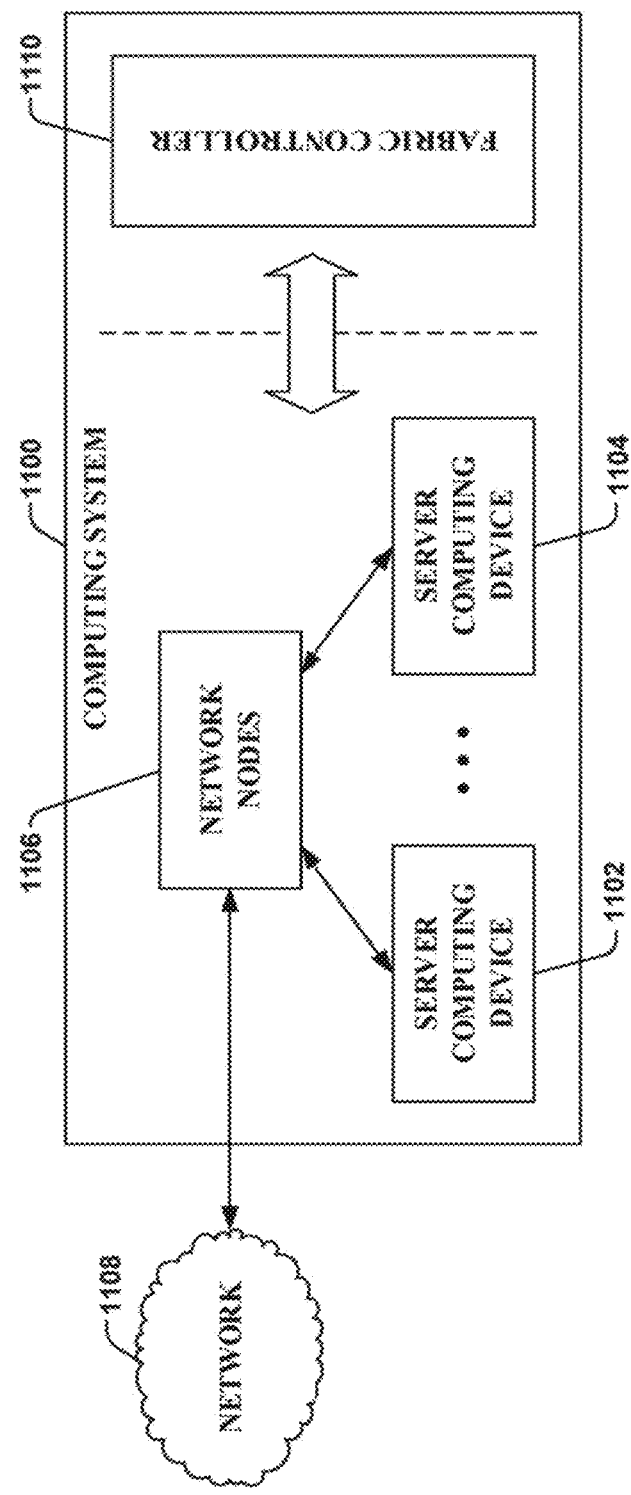
FIG. 11 depicts a high-level illustration of an exemplary computing system that may be used in accordance with the systems, methods, and computer-readable media disclosed herein, according to embodiments of the present disclosure.

Turning to FIG. 11, FIG. 11 depicts a high-level illustration of an exemplary computing system 1100 that may be used in accordance with the systems, methods, modules, and computer-readable media disclosed herein, according to embodiments of the present disclosure. For example, the computing system 1100 may be or may include the computing device 1000. Additionally, and/or alternatively, the computing device 1000 may be or may include the computing system 1100.

The computing system 1100 may include a plurality of server computing devices, such as a server computing device 1102 and a server computing device 1104 (collectively referred to as server computing devices 1102-1104).

The server computing device 1102 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 1102, at least a subset of the server computing devices 1102-1104 other than the server computing device 1102 each may respectively include at least one processor and a memory. Moreover, at least a subset of the server computing devices 1102-1104 may include respective data stores.

Processor(s) of one or more of the server computing devices 1102-1104 may be or may include the processor, such as processor 1002. Further, a memory (or memories) of one or more of the server computing devices 1002-1004 can be or include the memory, such as memory 1004. Moreover, a data store (or data stores) of one or more of the server computing devices 1102-1104 may be or may include the data store, such as data store 1008.

The computing system 1100 may further include various network nodes 1106 that transport data between the server computing devices 1102-1104. Moreover, the network nodes 1106 may transport data from the server computing devices 1102-1104 to external nodes (e.g., external to the computing system 1100) by way of a network 1108. The network nodes 1102 may also transport data to the server computing devices 1102-1104 from the external nodes by way of the network 1108. The network 1108, for example, may be the Internet, a cellular network, or the like. The network nodes 1106 may include switches, routers, load balancers, and so forth.

A fabric controller 1110 of the computing system 1100 may manage hardware resources of the server computing devices 1102-1104 (e.g., processors, memories, data stores, etc. of the server computing devices 1102-1104). The fabric controller 1110 may further manage the network nodes 1106. Moreover, the fabric controller 1110 may manage creation, provisioning, de-provisioning, and supervising of managed runtime environments instantiated upon the server computing devices 1102-1104.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for improved real-time audio processing, the method comprising:
   constructing a deep neural network model, including a plurality of at least one-bit neurons, configured to output a predicted label of audio data, the plurality of at least one-bit neurons arranged in a plurality of layers, including at least one hidden layer, and being connected by a plurality of connections, each connection having at least a one-bit weight, wherein both of the plurality of at least one-bit neurons and the plurality of connections have a reduced bit precision;
   receiving a training data set, the training data set including audio data;
   assigning a first representative bit for each input value of audio data of the training data set based on a sign of the input value;
   calculating an average distance from a predetermined reference value;
   assigning a second representative bit for each input value of audio data of the training data set based on the calculated average distance;
   calculating a second average distance based on the calculated average distance;
   assigning, for each input value, an approximate value as a reference of each section of the assigned first representative bit and second representative bit based on the second average distance;
   training the deep neural network model using the training data set; and
   outputting a trained deep neural network model configured to output a predicted label of real-time audio data.

2. The method according to claim 1, wherein the deep neural network comprises one of one hidden layer, two hidden layers, and three hidden layers.

3. The method according to claim 1, wherein the connections include one-bit weights.

4. The method according to claim 1, wherein the plurality of at least one-bit neurons are one of one-bit neurons and two-bit neurons.

5. The method according to claim 1, wherein the at least one hidden layer includes less neurons than an input layer of the deep neural network and an output later of the deep neural network.

6. The method according to claim 5, wherein the at least one hidden layer may include one of 32, 128, and 512 neurons.

7. The method according to claim 1, wherein the received training data set includes audio data that has been previously scaled for precision.

8. The method according to claim 1, further comprising:
receiving a test data set, the test data set including audio data with unseen noise; and
evaluating the trained deep neural network using the received test data set.

9. The method according to claim 1, wherein the steps are iteratively or concurrently performed to output a plurality of trained deep neural network models, each configured to output a predicted label of real-time audio data, wherein each constructed deep neural network comprises at least one of a different number of neurons, a different number of neuron bits, a different number of layers, and a different number of weight bits.

10. The method according to claim 1, further comprising:
receiving audio data, wherein audio data includes one or more audio frames represented in one of a time domain or a conversion domain;
processing the audio data in segments using the trained deep neural network, wherein each segment includes one or more frames of the audio data.

11. A system for improved real-time audio processing, the system including:
a data storage device that stores instructions for improved real-time audio processing; and
a processor configured to execute the instructions to perform a method including:
constructing a deep neural network model, including a plurality of at least one-bit neurons, configured to output a predicted label of audio data, the plurality of at least one-bit neurons arranged in a plurality of layers, including at least one hidden layer, and being connected by a plurality of connections, each connection having at least a one-bit weight, wherein both of the plurality of at least one-bit neurons and the plurality of connections have a reduced bit precision;
receiving a training data set, the training data set including audio data;
assigning a first representative bit for each input value of audio data of the training data set based on a sign of the input value;
calculating an average distance from a predetermined reference value;
assigning a second representative bit for each input value of audio data of the training data set based on the calculated average distance;
calculating a second average distance based on the calculated average distance;
assigning, for each input value, an approximate value as a reference of each section of the assigned first representative bit and second representative bit based on the second average distance;
training the deep neural network model using the training data set; and
outputting a trained deep neural network model configured to output a predicted label of real-time audio data.

12. The system according to claim 11, wherein the deep neural network comprises one of one hidden layer, two hidden layers, and three hidden layers.

13. The system according to claim 11, wherein the connections include one-bit weights.

14. The system according to claim 11, wherein the plurality of at least one-bit neurons are one of one-bit neurons and two-bit neurons.

15. The system according to claim 11, wherein the at least one hidden layer includes less neurons than an input layer of the deep neural network and an output later of the deep neural network.

16. The system according to claim 11, wherein the received training data set includes audio data that has been previously scaled for precision.

17. A computer-readable storage device storing instructions that, when executed by a computer, cause the computer to perform a method for improved real-time audio processing, the method including:
constructing a deep neural network model, including a plurality of at least one-bit neurons, configured to output a predicted label of audio data, the plurality of at least one-bit neurons arranged in a plurality of layers, including at least one hidden layer, and being connected by a plurality of connections, each connection having at least a one-bit weight, wherein both of the plurality of at least one-bit neurons and the plurality of connections have a reduced bit precision;
receiving a training data set, the training data set including audio data;
assigning a first representative bit for each input value of audio data of the training data set based on a sign of the input value;
calculating an average distance from a predetermined reference value;
assigning a second representative bit for each input value of audio data of the training data set based on the calculated average distance;
calculating a second average distance based on the calculated average distance;
assigning, for each input value, an approximate value as a reference of each section of the assigned first representative bit and second representative bit based on the second average distance;
training the deep neural network model using the training data set; and
outputting a trained deep neural network model configured to output a predicted label of real-time audio data.

18. The computer-readable storage device according to claim 17, wherein the deep neural network comprises one of one hidden layer, two hidden layers, and three hidden layers.

19. The computer-readable storage device according to claim 17, wherein the connections include one-bit weights.

20. The computer-readable storage device according to claim 17, wherein the received training data set includes audio data that has been previously scaled for precision.

* * * * *